United States Patent
Tsuda et al.

(10) Patent No.: US 8,889,095 B2
(45) Date of Patent: *Nov. 18, 2014

(54) METHOD FOR STABILIZING SIZE OF PLATINUM HYDROXIDE POLYMER

(75) Inventors: Toyofumi Tsuda, Hamamatsu (JP);
Fumikazu Kimata, Hamamatsu (JP);
Kazuya Miura, Hamamatsu (JP)

(73) Assignee: Suzuki Motor Corporation,
Hamamatsu-shi, Shizuoka-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,681

(22) Filed: May 7, 2012

(65) Prior Publication Data
US 2012/0289400 A1    Nov. 15, 2012

(30) Foreign Application Priority Data
May 10, 2011   (JP) .................. 2011-105106

(51) Int. Cl.
| | |
|---|---|
| C01B 13/14 | (2006.01) |
| C01D 1/02 | (2006.01) |
| B01J 23/58 | (2006.01) |
| B01J 23/00 | (2006.01) |
| B01J 23/44 | (2006.01) |
| B01J 35/00 | (2006.01) |
| C01G 55/00 | (2006.01) |
| B01J 23/42 | (2006.01) |
| B01D 53/94 | (2006.01) |
| B01J 21/04 | (2006.01) |
| C01G 49/00 | (2006.01) |
| B82Y 30/00 | (2011.01) |
| B01J 21/06 | (2006.01) |

(52) U.S. Cl.
CPC ............ *C01G 55/004* (2013.01); *C01P 2004/61* (2013.01); *B01D 2255/2092* (2013.01); *B01D 2255/20715* (2013.01); *B01J 35/0013* (2013.01); *B01D 2255/1021* (2013.01); *B01J 21/04* (2013.01); *C01G 49/0036* (2013.01); *C01P 2004/64* (2013.01); *Y02T 10/22* (2013.01); *B01J 23/42* (2013.01); *B82Y 30/00* (2013.01); *B01D 53/945* (2013.01); *B01J 21/066* (2013.01)
USPC ........ 423/592.1; 502/330; 502/325; 502/339; 423/594.2

(58) Field of Classification Search
CPC ............ B01J 23/40; B01J 23/44; B01J 23/42; B01D 2255/1021; Y02E 60/50
USPC ............. 502/339, 300, 325; 423/594.2, 592.1
See application file for complete search history.

(56) References Cited

U.S. PATENT DOCUMENTS 5,578,283 A * 11/1996 Chen et al. ................. 423/240 R
2011/0027385 A1 * 2/2011 Cairns et al. ................... 424/618

FOREIGN PATENT DOCUMENTS

JP    11-092150    4/1999

* cited by examiner

*Primary Examiner* — Anthony J Zimmer
*Assistant Examiner* — Haytham Soliman
(74) *Attorney, Agent, or Firm* — Alston & Bird LLP

(57) ABSTRACT

Provided is a method for stabilizing a size of a platinum hydroxide polymer capable of maintaining solution stability of a platinum hydroxide polymer in a solution. The method may include adding Zr ions to a solution containing a platinum hydroxide polymer at a Zr/Pt ratio of 1.0 to 40 in terms of molar concentration ratio.

8 Claims, 2 Drawing Sheets

METHOD FOR STABILIZING SIZE OF PLATINUM HYDROXIDE POLYMER

FIELD OF THE INVENTION

The present invention relates to a method for stabilizing a size of a platinum hydroxide polymer.

BACKGROUND OF THE INVENTION

Catalysts for automobiles have a function to decompose and remove hydrocarbons (HCs), nitrogen oxide ($NO_x$), and carbon monoxide (CO), which are harmful components in exhaust gas. Such a catalyst is produced by using, as a substrate, an inorganic material such as cordierite or a metal formed into a honeycomb shape. The harmful components are decomposed and removed when exhaust gas passes through the inside of the catalyst. To increase the contact efficiency of the catalyst with exhaust gas, the surface of the substrate is coated with a porous inorganic material, and furthermore, a trace amount of a noble metal is supported as an active component on a surface layer portion of the porous inorganic material. A platinum group metal such as platinum, palladium, or rhodium is used as the noble metal.

Recently, in order to rapidly treat exhaust gas at the ignition of an automobile engine, there has been a need for activation of the catalyst even at low temperatures. In this respect, improvement of purification performance (low-temperature activity) has been attempted by increasing the amount of the noble metal. However, the increase in the amount of the expensive noble metal leads to increase in costs of automobiles, and is disadvantageous to consumers. Hence, there has been a need for improvement in purification performances without increase in the amount of the noble metal.

In the meantime, a platinum hydroxide polymer is a hydroxide in which platinum atoms are cross-linked with about several to several tens of oxygen atoms. For preparation of the platinum hydroxide polymer, hexahydroxoplatinic acid ($H_2Pt(OH)_6$) is used as a raw material. The platinum hydroxide polymer is formed as follows. Specifically, hexahydroxoplatinic acid is caused to be present in the form of a hydroxo complex by being dissolved in a strong acid solution, and then the complex is subjected to influence of protons from the acid to thereby form reactive monomers and, in turn, to cause a polymerization reaction. Since the polymerization reaction proceeds rapidly, it is difficult to perform control during the reaction. However, when the acid concentration, the reaction temperature, and the raw material concentration are set to satisfy specific conditions, the polymer turns into a metastable state under which the polymer has a degree of polymerization depending on the conditions, and under which the reaction is temporarily stopped. In addition, since the polymerization reaction is irreversible, the polymerization state can be maintained even when the temperature is lowered from the reaction temperature. The number of platinum atoms contained in a polymer varies among platinum hydroxide polymers prepared as described above, depending on the degree of polymerization. Hence, it is possible to use this polymer, for example, as a precursor material for controlling a particle diameter of the noble metal for an exhaust gas catalyst or the like.

However, the polymerization reaction of the platinum hydroxide polymer gradually proceeds even at room temperature. Hence, not only does the particle diameter of the prepared platinum hydroxide polymer increase as compared with the initial particle diameter thereof, but also turbidity or precipitation occurs in the solution, resulting in decrease in platinum concentration in the solution. For this reason, it is difficult to store a solution containing a platinum hydroxide polymer at room temperature for long periods. In order to industrially use a solution containing a platinum hydroxide polymer as a material for an exhaust gas catalyst or the like, it is important to keep the metastable state for a long period.

In addition, suppose a case in which, after the control of the degree of polymerization, ion-exchanged water or the like is used to dilute the solution containing the platinum hydroxide polymer to thereby prepare a solution having a desired platinum concentration. In such a case, turbidity or precipitation occurs in the solution, because the platinum hydroxide polymer whose particle diameter has been controlled cannot be present stably in the solution. For this reason, in order to prepare a catalyst in which a platinum hydroxide polymer is supported, it is necessary to use a solution that is highly acidic and has a high platinum concentration. Hence, it is difficult to make the catalyst support a desired amount of platinum. In addition, the support on which platinum is supported needs to have acid resistance.

Japanese Patent Application Publication No. 11-92150 discloses stabilization of a platinum solution prepared by dissolving hexahydroxoplatinic acid into nitric acid. However, the target of the stabilization is not a solution containing a platinum hydroxide polymer. In addition, the platinum solution is diluted not with ion-exchanged water, but with nitric acid. Hence, the above-described problem cannot be solved.

SUMMARY OF THE INVENTION

The present invention has been made in view of the above-described circumstances, and an object of the present invention is to provide a method for stabilizing a size of a platinum hydroxide polymer, the method being capable of maintaining solution stability of a platinum hydroxide polymer in a solution.

The present inventors have found that Zr ions should be coexistent in a solution containing a platinum hydroxide polymer to achieve the above-described object.

Specifically, the present invention provides a method for stabilizing a size of a 10 platinum hydroxide polymer, comprising adding Zr ions to a solution containing a platinum hydroxide polymer at a Zr/Pt ratio of 1.0 to 40 in terms of molar concentration ratio.

The Zr/Pt ratio is preferably 1.7 or higher in terms of molar concentration ratio.

The addition of the Zr ions is preferably conducted by using a zirconium oxynitrate solution or a zirconium acetate solution.

The method for stabilizing a size of a platinum hydroxide polymer of the present invention makes it possible to maintain solution stability of a platinum hydroxide polymer in a solution.

DETAILED DESCRIPTION OF THE INVENTION

Figure 1:
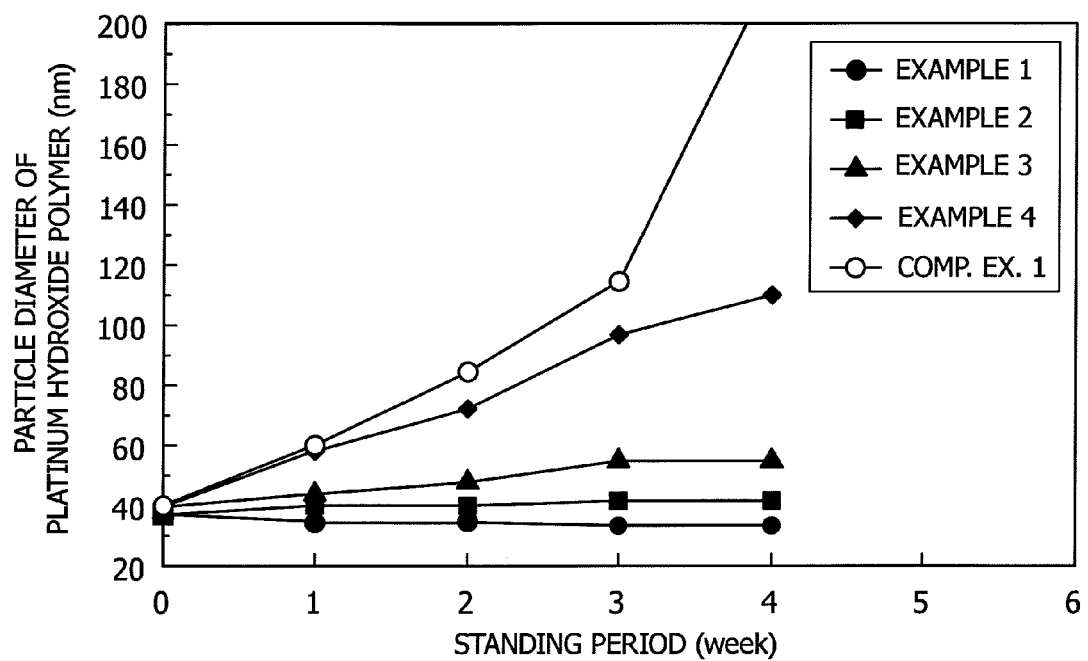
FIG. 1 is a graph showing change in particle diameter of platinum hydroxide polymers which were allowed to stand at room temperature.

Hereinafter, a method for stabilizing a size of a platinum hydroxide polymer 5 according to the present invention will be described.

(Preparation of Solution Containing Platinum Hydroxide Polymer)

A platinum hydroxide polymer can be obtained by a polymerization reaction of hexahydroxoplatinic acid, which serves as a raw material, in an acidic solution.

The acidic solution is not particularly limited, and a solution prepared at an acid concentration of 4.5 to 6.5 mol/L, and preferably 6.0 mol/L can be used as the acidic solution, for example. This is because an acid concentration in this range enables dissolution of platinum serving as the raw material.

Hexahydroxoplatinic acid can be added to the acidic solution, for example, at a platinum concentration of 4 to 20 g/L, and preferably 12 to 14 g/L. This is because a platinum concentration in this range enables dissolution of platinum in the acidic solution having the acid concentration selected as above, and also enables a favorable polymerization control in a reaction temperature region to be described later.

A reaction temperature is, for example, in a range from 50 to 80° C., and is preferably 70° C. This is because the polymerization reaction does not proceed excessively in this temperature range, so that the platinum hydroxide polymer is monodispersed as fine particles in the solution, and hence a stable state can be maintained.

A size (particle diameter) of the platinum hydroxide polymer is preferably 60 nm or less, and more preferably in a range from 20 to 50 nm. A size in this range enables a stable state to be maintained not only in the acidic solution, but also in a dilute solution, to be described later. For example, dynamic light scattering (DLS) or the like can be used as a method for measuring the particle diameter. Note that a numeric value of the particle diameter used herein is a value measured based on DLS intensity. This is because a value measured based on the intensity is highly reproducible owing to the characteristics of DLS. A value measured based on the intensity is expressed as a greater value than the actual particle diameter (about 6 to 8 times the actual particle diameter). For example, when a value measured based on the intensity is 20 to 60 nm, the actual particle diameter is 3 to 7 nm.

(Addition of Zr Ions)

Zr ions are added to the obtained solution containing a platinum hydroxide polymer at a Zr/Pt ratio of 1.0 to 40 in terms of molar concentration ratio. The addition of the Zr ions makes it possible to inhibit the polymerization reaction of the platinum hydroxide polymer, so that turbidity and precipitation become less likely to occur in the solution.

A platinum hydroxide polymer present in a solution is positively charged. Hence, when another cation species, which is positively charged, coexists with the platinum hydroxide polymer in the solution, an electrostatic repulsive force is generated between the platinum hydroxide polymer and the cation species. Since this electrostatic repulsive force restricts the movement of the platinum hydroxide polymer, the opportunity for collision of platinum hydroxide polymer molecules is reduced. For this reason, the polymerization reaction rate of the platinum hydroxide polymer is greatly reduced, so that the stability of the platinum hydroxide polymer is improved. In addition, the higher the valence of the coexistent cation species is, the greater the electrostatic repulsive force generated between the cation species and the platinum hydroxide polymer is. Hence, the stability as described above can be obtained even by a small addition amount.

The coexisting cations need to be selected as appropriate depending on an application of the platinum hydroxide polymer. When platinum is supported on an exhaust gas catalyst by use of the above-described stabilized solution containing a platinum hydroxide polymer, it is necessary to select a substance which is less likely to adversely affect performances of the catalyst after the supporting, even when the added element (cations) remains on the support.

Zr is excellent in stabilizing the platinum hydroxide polymer in a solution, because Zr forms tetravalent cations in a solution. In addition, stabilization of the platinum hydroxide polymer in a solution with Ti or Hf can be expected, because Ti and Hf also form tetravalent cations in a solution. In an exhaust gas catalyst, Zr oxide is one of the major components constituting the exhaust gas catalyst, and small amounts of Ti and Hf are contained in the exhaust gas catalyst as impurities. Here, Zr ions are added to the solution containing the platinum hydroxide polymer, from the viewpoint of performances of the catalyst after the supporting.

The addition of the Zr ions is preferably conducted by using a zirconium oxynitrate solution or a zirconium acetate solution. When counter anions of Zr are nitrate ions or acetate ions, the counter anions are removed from the support as a gas during calcination of the catalyst. In addition, also when a zirconium sulfate solution or a zirconium chloride solution is used, stabilization of the platinum hydroxide polymer in the solution as described above can be expected. However, it is desirable to use a zirconium oxynitrate solution or a zirconium acetate solution from the viewpoints of performances of the catalyst after the supporting.

The Zr/Pt ratio in the solution which contains the platinum hydroxide polymer and to which the Zr ions are added is 1.0 to 40 in terms of molar concentration ratio. When the Zr/Pt ratio is within this concentration range, an initial size of a platinum hydroxide polymer prepared at room temperature is maintained, so that turbidity and precipitation are less likely to occur in the solution, and the possibility of reducing the platinum concentration is also low. Accordingly, the solution containing the platinum hydroxide polymer can be stored for long periods at room temperature. Note that, even when the Zr/Pt ratio exceeds 40 in terms of molar concentration ratio, a similar effect to that obtained when the Zr/Pt ratio is within the above-described concentration ratio range can be obtained. However, the upper limit value of the Zr/Pt ratio is sufficient, when the upper limit is 40 in terms of molar concentration ratio.

Moreover, the Zr/Pt ratio is preferably 1.7 or higher in terms of molar concentration ratio. When the Zr/Pt ratio is within this concentration ratio range, the platinum hydroxide polymer can be present stably not only in the acidic solution but also in a solution having a low proton concentration, to be described later, without formation of turbidity or precipitation in the solution.

As described above, the present invention makes it possible to maintain solution stability of a platinum hydroxide polymer in an acidic solution.

Moreover, the method for stabilizing a size of a platinum hydroxide polymer of the present invention makes it possible to maintain solution stability of a platinum hydroxide polymer also in a solution having a low proton concentration.

The solution having a low proton concentration is, for example, a solution obtained by diluting 2-fold to 200-fold the above-described solution containing the platinum hydroxide polymer with ion-exchanged water or the like.

By adding the Zr ions to the solution having a low proton concentration at a Zr/Pt ratio of 1.7 or higher in terms of molar concentration ratio as described above, the platinum hydroxide polymer can be present stably without formation of turbidity or precipitation in the solution. A platinum hydroxide polymer in a solution having a low proton concentration is destabilized because of the low proton concentration in the solution, and the solubility thereof is reduced. Hence, the polymerization reaction and a deposition reaction of the precipitation are accelerated. Since the polymerization reaction and the deposition reaction of the precipitation can be inhibited by adding the above-described Zr ions to this solution, the stability in the solution having a low proton concentration is improved, and a handling property of the solution having a low proton concentration can be greatly improved. The platinum hydroxide polymer can be stabilized in a dilute solution such as the solution having a low proton concentration. Hence, damage on a support material due to a strong acid can be reduced, when platinum is supported on an automobile exhaust gas catalyst or a fuel cell material, for example.

EXAMPLES

Hereinafter, the present invention will be described specifically by showing Examples and the like. However, the present invention is not limited to these.
(Preparation of Solution Containing Platinum Hydroxide Polymer)

Into 100 mL of a 6.0 mol/L nitric acid solution, 2.16 g of hexahydroxoplatinic acid (manufactured by Tanaka Kikinzoku Kogyo K. K., platinum: 65 wt %) was dissolved to obtain a platinum concentration of 14 g/L, and the solution was held at 70° C. for 22 hours. Thus, a solution containing a platinum hydroxide polymer was obtained.

The prepared solution was measured by dynamic light scattering (DLS: Zetasizer 25 manufactured by Sysmex Corporation). As a result, the size of the platinum hydroxide polymer was estimated to be 40 nm.

Stability of Platinum Hydroxide Polymer in Long Term Storage

Example 1

To 86 mL of the solution containing the platinum hydroxide polymer and having a 5 platinum concentration of 14 g/L, 10 mL of a zirconium oxynitrate solution having a Zr concentration of 3.1 mol/L was added. Then, the solution was diluted to 100 mL with a 6.0 mol/L nitric acid solution by use of a volumetric flask. Thus, a solution having a platinum concentration of 12 g/L and a Zr/Pt ratio (molar concentration ratio) of 5.0 was obtained.

Example 2

To 86 mL of the solution containing the platinum hydroxide polymer and having a platinum concentration of 14 g/L, 3.4 mL of a zirconium oxynitrate solution having a Zr concentration of 3.1 mol/L was added. Then, the solution was diluted to 100 mL with a 6.0 mol/L nitric acid solution by use of a volumetric flask. Thus, a solution having a platinum concentration of 12 g/L and a Zr/Pt ratio (molar concentration ratio) of 1.7 was obtained.

Example 3

To 86 mL of the solution containing the platinum hydroxide polymer and having a platinum concentration of 14 g/L, 2.0 mL of a zirconium oxynitrate solution having a Zr concentration of 3.1 mol/L was added. Then, the solution was diluted to 100 mL with a 6.0 mol/L nitric acid solution by use of a volumetric flask. Thus, a solution having a platinum concentration of 12 g/L and a Zr/Pt ratio (molar concentration ratio) of 1.0 was obtained.

Example 4

To 86 mL of the solution containing the platinum hydroxide polymer and having a platinum concentration of 14 g/L, 1.0 mL of a zirconium oxynitrate solution having a Zr concentration of 3.1 mol/L was added. Then, the solution was diluted to 100 mL with a 6.0 mol/L nitric acid solution by use of a volumetric flask. Thus, a solution having a platinum concentration of 12 g/L and a Zr/Pt ratio (molar concentration ratio) of 0.5 was obtained.

Comparative Example 1

With a 6.0 mol/L nitric acid solution, 86 mL of the solution containing the platinum hydroxide polymer and having a platinum concentration of 14 g/L was diluted to 100 mL by use of a volumetric flask. Thus, a solution having a platinum concentration of 12 g/L was obtained.

While the solutions prepared Examples 1 to 4 and Comparative Example 1 were allowed to stand at room temperature, the solutions were measured every week in terms of the presence or absence of turbidity or deposition by visual observation, and the particle diameter of the platinum hydroxide polymer by DLS measurement. Table 1 and FIG. 1 show the results of the measurements, respectively. Note that solutions estimated to have a particle diameter of 80 nm or more by DLS are indicated as "Turbid", and solutions in which deposition was apparent in the standing state were indicated as "Precipitated."

TABLE 1

| | | Standing period | | | |
|---|---|---|---|---|---|
| | Zr/Pt ratio | week | weeks | weeks | weeks |
| Example 1 | | Absent | Absent | Absent | Absent |
| Example 2 | | Absent | Absent | Absent | Absent |
| Example 3 | | Absent | Absent | Absent | Absent |
| Example 4 | | Absent | Absent | Turbid | Turbid |
| Comp. Ex 1 | | Absent | Turbid | Turbid | Precipitated |

As can be seen from Table 1 and FIG. 1, neither turbidity nor precipitation was observed in any of the solutions prepared in Examples 1 to 3, and the platinum hydroxide polymers maintained the sizes as those measured immediately after the preparation, even after 4 weeks had elapsed since the start of the standing at room temperature. The growth in size of the platinum hydroxide polymer was inhibited in the solution prepared in Example 4, but turbidity was observed at week 3 after the start of the standing at room temperature. The size of the platinum hydroxide polymer in the solution prepared in Comparative Example 1 gradually increased, and turbidity was observed at week 2, and precipitation was observed at week 4, after the start of the standing at room temperature.

These results indicate that the addition of the Zr ions at a Zr/Pt ratio of 1.0 or higher 5 enables long-term storage of a solution containing a platinum hydroxide polymer.

Stability of Diluted Solutions Containing Platinum Hydroxide Polymer

Example 5

To 50 mL of the solution containing the platinum hydroxide polymer and having a platinum concentration of 14 g/L, 47 mL of a zirconium oxynitrate solution having a Zr concentration of 3.1 mol/L was added. Then, the solution was diluted to 100 mL with ion-exchanged water by use of a volumetric flask. Thus, a 2-fold diluted solution having a platinum concentration of 7 g/L and a Zr/Pt ratio (molar concentration ratio) of 40 was obtained.

Example 6

With ion-exchanged water, 6.7 mL of the solution of Example 5 was diluted to 100 mL by use of a volumetric flask. Thus, a 30-fold diluted solution having a platinum concentration of 0.47 g/L and a Zr/Pt ratio (molar concentration ratio) of 40 was obtained.

Example 7

With ion-exchanged water, 1.0 mL of the solution of Example 5 was diluted to 100 mL by use of a volumetric flask. Thus, a 200-fold diluted solution having a platinum concentration of 0.07 g/L and a Zr/Pt ratio (molar concentration ratio) of 40 was obtained.

Example 8

To 50 mL of the solution containing the platinum hydroxide polymer and having a 25 platinum concentration of 14 g/L, 5.8 mL of a zirconium oxynitrate solution having a Zr concentration of 3.1 mol/L was added. Then, the solution was diluted to 100 mL with ion exchanged water by use of a volumetric flask. Thus, a 2-fold diluted solution having a platinum concentration of 7 g/L and a Zr/Pt ratio (molar concentration ratio) of 5.0 was obtained.

Example 9

With ion-exchanged water, 6.7 mL of the solution of Example 8 was diluted to 100 mL by use of a volumetric flask. Thus, a 30-fold diluted solution having a platinum concentration of 0.47 g/L and a Zr/Pt ratio (molar concentration ratio) of 5.0 was obtained.

Example 10

With ion-exchanged water, 1.0 mL of the solution of Example 8 was diluted to 100 10 mL by use of a volumetric flask. Thus, a 200-fold diluted solution having a platinum concentration of 0.07 g/L and a Zr/Pt ratio (molar concentration ratio) of 5.0 was obtained.

Example 11

To 50 mL of the solution containing the platinum hydroxide polymer and having a platinum concentration of 14 g/L, 2.0 mL of a zirconium oxynitrate solution having a Zr 15 concentration of 3.1 mol/L was added. Then, the solution was diluted to 100 mL with ion-exchanged water by use of a volumetric flask. Thus, a 2-fold diluted solution having a platinum concentration of 7 g/L and a Zr/Pt ratio (molar concentration ratio) of 1.7 was obtained.

Example 12

With ion-exchanged water, 6.7 mL of the solution of Example 11 was diluted to 100 mL by use of a volumetric flask. Thus, a 30-fold diluted solution having a platinum concentration of 0.47 g/L and a Zr/Pt ratio (molar concentration ratio) of 1.7 was obtained.

Example 13

With ion-exchanged water, 1.0 mL of the solution of Example 11 was diluted to 100 25 mL by use of a volumetric flask. Thus, a 200-fold diluted solution having a platinum concentration of 0.07 g/L and a Zr/Pt ratio (molar concentration ratio) of 1.7 was obtained.

Example 14

To 50 mL of the solution containing the platinum hydroxide polymer and having a platinum concentration of 14 g/L, 1.2 mL of a zirconium oxynitrate solution having a Zr concentration of 3.1 mol/L was added. Then, the solution was diluted to 100 mL with ion exchanged water by use of a volumetric flask. Thus, a 2-fold diluted solution having a platinum concentration of 7 g/L and a Zr/Pt ratio (molar concentration ratio) of 1.0 was obtained.

Example 15

With ion-exchanged water, 6.7 mL of the solution of Example 14 was diluted to 100 10 mL by use of a volumetric flask. Thus, a 30-fold diluted solution having a platinum concentration of 0.47 g/L and a Zr/Pt ratio (molar concentration ratio) of 1.0 was obtained.

Example 16

With ion-exchanged water, 1.0 mL of the solution of Example 14 was diluted to 100 mL by use of a volumetric flask. Thus, a 200-fold diluted solution having a platinum 15 concentration of 0.07 g/L and a Zr/Pt ratio (molar concentration ratio) of 1.0 was obtained.

Comparative Example 2

With ion-exchanged water, 50 mL of the solution containing the platinum hydroxide polymer and having a platinum concentration of 14 g/L was diluted to 100 mL by use of a volumetric flask. Thus, a 2-fold diluted solution having a platinum concentration of 7 g/L 20 was obtained.

Comparative Example 3

With ion-exchanged water, 3.3 mL of the solution containing the platinum hydroxide polymer and having a platinum concentration of 14 g/L was diluted to 100 mL by use of a volumetric flask. Thus, a 30-fold diluted solution having a platinum concentration of 0.47 25 g/L was obtained.

Comparative Example 4

With ion-exchanged water, 0.5 mL of the solution containing the platinum hydroxide polymer and having a platinum concentration of 14 g/L was diluted to 100 mL by use of a volumetric flask. Thus, a 200-fold diluted solution having a platinum concentration of 0.05 g/L was obtained.

The solutions prepared in Examples 5 to 16 and Comparative Examples 2 to 4 were allowed to stand at room temperature for 24 hours, and they were then visually observed in terms of the presence or absence of turbidity or precipitation. Determination of the presence or absence of turbidity or precipitation was conducted in the same manner as in Example 1. Table 2 shows the results.

TABLE 2

| | Zr/Pt ratio | Dilution ratio | Presence or absence of turbidity or precipitation |
|---|---|---|---|
| Example 5 | | | Absent |
| Example 6 | | | Absent |
| Example 7 | | | Absent |
| Example 8 | | | Absent |
| Example 9 | | | Absent |
| Example 10 | | | Absent |
| Example 11 | | | Absent |
| Example 12 | | | Absent |
| Example 13 | | | Absent |
| Example 14 | | | Precipitated |
| Example 15 | | | Precipitated |
| Example 16 | | | Absent |
| Comp. Ex. 2 | | | Precipitated |
| Comp. Ex. 3 | | | Precipitated |
| Comp. Ex. 4 | | | Precipitated |

As can be seen from Table 2, neither turbidity nor precipitation was observed in any 15 of the solutions which were prepared in Examples 5 to 13 and had Zr/Pt ratios of 1.7 or higher. As for the solutions which were prepared in Examples 14 to 16 and had a Zr/Pt ratio of 1.0, neither turbidity nor precipitation was observed in Example 16 with a high dilution ratio, whereas precipitation was observed in each of Examples 14 and 15 with low dilution ratios. Deposition was observed in each of the solutions which were prepared in Comparative Examples 2 to 4 and contained no Zr ions. These results indicate that the addition of Zr ions at a Zr/Pt ratio of 1.7 or higher enables a solution containing a platinum hydroxide polymer to be diluted at any dilution ratio.

Effects of Addition of Zr Ions on Catalytic Performances

Example 17

To 10 g of an alumina powder, 8.3 mL of the solution prepared in Example 2 was added dropwise, and it was evaporated to dryness. Then, the material was calcined by being held at 500° C. for 1 hour. Thus, a catalyst powder in which 1% by weight of platinum was supported was obtained.

Example 18

To 10 g of an alumina powder, 8.3 mL of the solution prepared in Example 1 was added dropwise, and it was evaporated to dryness. Then, the material was calcined by being held at 500° C. for 1 hour. Thus, a catalyst powder in which 1% by weight of platinum was supported was obtained.

Comparative Example 5

To 10 g of an alumina powder, 8.3 mL of the solution prepared in Comparative Example 1 was added dropwise, and it was evaporated to dryness. Then, the material was calcined by being held at 500° C. for 1 hour. Thus, a catalyst powder in which 1% by weight of platinum was supported was obtained.

Figure 2A:
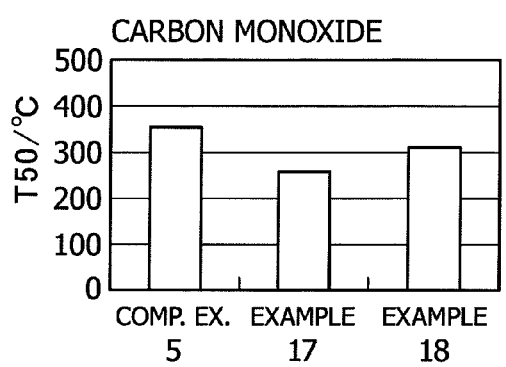
FIG. 2 shows graphs in which comparison is made among catalysts of Examples 17 and 18 and Comparative Example 5 in terms of temperatures (T50s) at which removal ratios of components ((A) carbon monoxide, (B) hydrocarbons, and (C) nitrogen oxide) reached 50%.
Figure 2B:
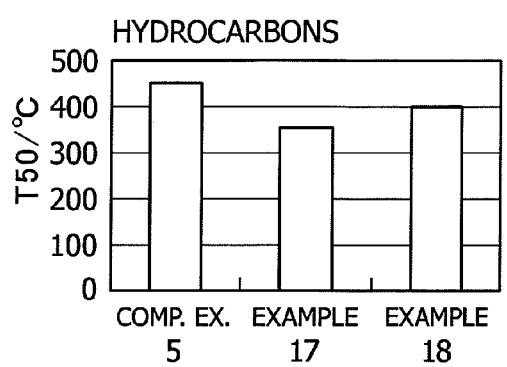
Figure 2C:
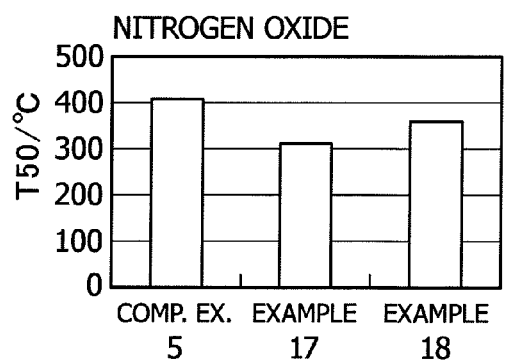

Each of the catalyst powders prepared in Examples 17 and 18 and Comparative Example 5 was pelletized and ground. Then, a model gas test was conducted to evaluate catalytic performances of the obtained particulate catalyst having particle diameters of 0.5 to 1.0 mm. The model gas test was conducted as follows. Specifically, 0.2 g of the particulate catalyst was held in a reaction tube, and the temperature was raised from room temperature to 500° C. at 25° C./minute, while a gas having a composition shown in Table 3 was allowed to flow at 1800 mL/minute. Evaluation of the catalytic performances was conducted by comparing temperatures (T50s) at which the removal ratios of carbon monoxide, hydrocarbons, and nitrogen oxide reached 50%. A low T50 value indicates a better catalytic activity. FIG. 2 shows the results. Note that each removal ratio was calculated by the following formula (Formula 1):

Removal ratio (%)=(1−concentration in treated gas/concentration in untreated gas)×100    (Formula 1)

TABLE 3

| Composition of model gas |
|---|
| CO/% |
| NO/ppm |
| Propene/ppm |
| Propane/ppm |
| $O_2$/% |
| $H_2$/% |
| $H_2O$/% |
| $N_2$    BALANCE |

As can be seen from FIG. 2, the T50 of each component achieved by each of the 15 catalysts of Examples 17 and 18 was not elevated in comparison with that achieved by the catalyst of Comparative Example 5. Hence, it was shown that the addition of Zr ions does not adversely affect the catalytic performances.

Stability of Platinum Hydroxide Polymer Achieved by Addition of Zirconium Acetate Solution Example 19

To 86 mL of the solution containing the platinum hydroxide polymer and having a platinum concentration of 14 g/L, 10 mL of a zirconium acetate solution having a Zr concentration of 3.1 mol/L was added. Then, the solution was diluted to 100 mL with a 6.0 mol/L nitric acid solution by use of a volumetric flask. Thus, a solution having a platinum concentration of 12 g/L and a Zr/Pt ratio (molar concentration ratio) of 5.0 was obtained.

Example 20

To 86 mL of the solution containing the platinum hydroxide polymer and having a platinum concentration of 14 g/L, 10 mL of a zirconium oxynitrate solution having a Zr concentration of 3.1 mol/L was added. Then, the solution was diluted to 100 mL with a 6.0 mol/L nitric acid solution by use of a volumetric flask. Thus, a solution having a platinum concentration of 12 g/L and a Zr/Pt ratio (molar concentration ratio) of 5.0 was obtained.

Comparative Example 6

With a 6.0 mol/L nitric acid solution, 86 mL of the solution containing the platinum hydroxide polymer and having a platinum concentration of 14 g/L was diluted to 100 mL by use of a volumetric flask. Thus, a solution having a platinum concentration of 12 g/L was obtained.

The solutions prepared in Examples 19 and 20 and Comparative Example 6 were held at 80° C. for 22 hours. Such heating greatly accelerates the polymerization reaction rate, 20 and hence enables evaluation of the stability of a solution in a short period and in a simple manner. Table 4 shows the results.

TABLE 4

| | Presence or absence of turbidity or precipitation |
|---|---|
| Example 19 | Absent |
| Example 20 | Absent |
| Comp. Ex. 6 | Precipitated |

As can be seen from Table 4, neither turbidity nor precipitation was observed in any of the solutions prepared in Examples 19 and 20, whereas precipitation was observed in the solution prepared in Comparative Example 6.

These results indicate that the addition of a zirconium acetate solution also makes it possible to obtain a stability of a solution containing a platinum hydroxide polymer, as in the case with the addition of a zirconium oxynitrate solution.

The content of Japanese Patent Application No. 2011-105106, including the specification, the claims, the drawings and the abstract thereof is incorporated herein by reference in its entirety.

What is claimed is:

1. A method for stabilizing a size of a platinum hydroxide polymer, consisting essentially of adding Zr ions to a solution containing a platinum hydroxide polymer at a Zr/Pt ratio of 1.0 to 40 in terms of molar concentration ratio; wherein the addition of the Zr ions is conducted by using a zirconium oxynitrate solution or a zirconium acetate solution.

2. The method for stabilizing a size of a platinum hydroxide polymer according to claim 1, wherein the Zr/Pt ratio is 1.7 to 40 in terms of molar concentration ratio.

3. The method for stabilizing a size of a platinum hydroxide polymer according to claim 1, wherein the addition of the Zr ions is conducted by using a zirconium oxynitrate solution.

4. The method for stabilizing a size of a platinum hydroxide polymer according to claim 1, wherein the addition of the Zr ions is conducted by using a zirconium acetate solution.

5. A method for stabilizing a size of a platinum hydroxide polymer, consisting of adding Zr ions to a solution containing a platinum hydroxide polymer at a Zr/Pt ratio of 1.0 to 40 in terms of molar concentration ratio; wherein the addition of the Zr ions is conducted by using a zirconium oxynitrate solution or a zirconium acetate solution.

6. The method for stabilizing a size of a platinum hydroxide polymer according to claim 5, wherein the Zr/Pt ratio is 1.7 to 40 in terms of molar concentration ratio.

7. The method for stabilizing a size of a platinum hydroxide polymer according to claim 5, wherein the addition of the Zr ions is conducted by using a zirconium oxynitrate solution.

8. The method for stabilizing a size of a platinum hydroxide polymer according to claim 5, wherein the addition of the Zr ions is conducted by using a zirconium acetate solution.

\* \* \* \* \*